United States Patent Office 3,043,841
Patented July 10, 1962

3,043,841
N-BENZYL-2-PHENYL-3-METHYL-MORPHOLINE
Harm Siemer, Konstanz, and Adolf Doppstadt, Konstanz-Litzelstetten, Germany, assignors to Ravensberg G.m.b.H., Chemische Fabrik, Konstanz, Germany
No Drawing. Filed May 6, 1958, Ser. No. 733,270
Claims priority, application Germany May 7, 1957
1 Claim. (Cl. 260—247)

This invention relates to substituted morpholines and is more particularly directed to a process for the preparation of pharmacologically useful multi-substituted morpholines, having particular regard to the stereochemical conditions in the 2,3 position. The invention is also concerned with novel multi-substituted morpholines useful as intermediaries in the inventive process for producing known substituted morpholines.

It is a primary object of this invention to provide a novel process for the preparation of substituted morpholines, wherein the substituents in the 2,3 position exhibit a threo configuration relative to each other and which morpholines correspond to the general Formula I

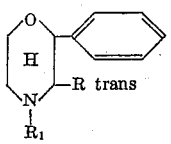

wherein R represents a lower alkyl group having 1–5 carbon atoms and $R_1$ stands for a benzyl group. The inventive process also provides for converting such morpholines into morpholines of the general formula

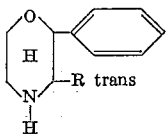

wherein R stands for lower alkyl.

Morpholines are generally prepared by dehydrating $\beta,\beta'$-dihydroxy diethylamines with acids, substantially in the same way as the $\delta$-glycols may be converted into their anhydrides. 2-methyl-morpholine may, for example, be obtained by heating $\beta$-methyl-$\beta,\beta'$-dihydroxy-diethylamine in the presence of concentrated sulfuric acid to 170°–180° C. and for about 8 hours. (See Журнал Общей Химии, Journal of General Chemistry, 20(82), 640,–647, Moscow, Allunions-Wiss. Chem.-Pharm. Ordshonikidse-Forschungsinst.) In the same manner 2,2-diphenyl-4-methyl-morpholine is obtained by heating $\beta,\beta$-diphenyl-N-methyl-diethanolamine with 70% sulfuric acid for three hours on a water-bath. (See Journal of the American Chemical Society, 73, 4030 (1951).)

With the view to preparing morpholines which are substituted in the 2,3 positions it is, however, required to observe particular precautionary measures in performing the ring-closure formation (see British Patent 773,780). The reason for this resides in the fact that other compounds or decomposition products may be formed owing to the action and influence of the temperature and/or the acids employed. 2,3 substituted morpholines are consequently obtained from the correspondingly substituted $\beta,\beta$-dihydroxy-diethyl amines either in the presence of concentrated sulfuric acid under carefully controlled reaction conditions (see also British Patent 773,780) or by means of 48% hydrobromic acid at boiling temperature (see German patent application B 33 373 IV$b$/12$p$).

Unsuccessful attempts have been made to dehydrate threo and erythro N-benzyl-$\beta,\beta'$-dihydroxy-diethylamines of the general Formula II

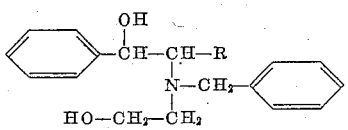

wherein R is a lower alkyl having 1–5 carbon atoms, in accordance with the above described ring formation processes, so as to obtain the corresponding N-benzylmorpholines. A variety of such experiments have been conducted both at room and elevated temperatures, with concentrated and diluted sulfuric acid, with 48% hydrobromic acid and also with concentrated hydrochloric acid. In spite of the fact that great efforts were invested in these experiments, they failed completely. The reaction products obtained in these experiments cannot be dissolved in ether and decompose upon distillation, even if the distillation is performed at reduced pressure.

It is accordingly an object of this invention to provide a process by means of which compounds of the general Formula II given above may be converted into 2,3 substituted morpholines in a simple and efficient manner. Considered from another aspect it is an object of this invention to provide for novel benzyl substituted morpholines which may be converted into useful known morpholines.

In accordance with the present invention, it has surprisingly been ascertained that threo aminodioles of the Formula II may be transformed into trans N-benzylmorpholines by heating the salts of the threo aminodioles of Formula II in the presence of a suitable halogenation agent and in the presence of dimethyl formamide. We have established that thionyl chloride is a particularly suitable halogenation agent. The halogenation agent, i.e. for example, thionyl chloride, should advantageously be used in an equimolar ratio or in slight excess. The N-benzylmorpholines are obtained in excellent yield.

The salts, such as for example threo N-benzyl-1-phenyl-2-hydroxy ethylamino-propanol(1)-HCl, are first dissolved in dimethylformamide, whereafter thionyl chloride is added and the reaction mixture thus obtained is heated in a vessel fitted with reflux cooler. The reaction products may be isolated in an exceedingly simple manner, by removing the solvent by distillation.

The residue is made alkaline and thereafter subjected to a fractional distillation. It is also feasible first to concentrate the reaction mixture, to make the residue alkaline and thereafter to dissolve the alkaline residue in ether. The desired morpholine may in this case be recovered from the ethereal solution either by distillation or by precipitating the ether-insoluble salts with for example hydrochloric acid in methanol.

In accordance with this invention we have thus succeeded in preparing for example trans N-benzyl-2-phenyl-3-methyl-morpholine from relatively readily available threo N-benzyl-1-phenyl-1-oxy-2-hydroxyethylamino-propane-HCl under very simple reaction conditions. This last mentioned morpholine [1] melts at 218° C. (The melting point of the cis N-benzyl-2-phenyl-3-methyl-morpholine-HCl is 236–238° C.) It should be observed in this connection that a successful ring formation is dependent on the use of both the halogenation agent (thionyl chloride) *and* the dimethyl formamide. It is not sufficient to use but one of the two. It is further pointed out that only the *threo* aminodiol salts of Formula II will yield the desired morpholine. If the erythro aminodiol salts of Formula II are employed instead, the starting product mainly is recovered again. In this latter case also small ---
[1] Which is a medicament promoting the circulation.

amounts of a mixture of trans and cis N-benzyl-2-phenyl-3-alkylmorpholine is formed.

Upon subjecting the substituted trans N-benzyl-morpholines of Formula I to a hydrogenating toluene splitting treatment, trans 2-phenyl-3-alkylmorpholines, for example trans-2-phenyl-3-methyl-morpholine, are obtained in an excellent yield. The splitting process may advantageously be carried out in alcoholic solution and in the presence of palladium coal. The hydrochloride of trans 2-phenyl-3-methyl morpholine melts at 182° C. This latter compound is well known both as a free base and in the form of its hydrochloride or theophyllinate.

The trans and cis forms of these morpholine compounds differ in several respects. They have for example different melting points. The trans form of 2-phenyl-3-methyl-morpholine-HCl, for example, melts at 182° C., while the cis form melts between 155 and 157° C. Their ability to dissolve in organic solvents is also different and they have distinguishable IR-spectra. Most important, however, is the fact that the trans compounds are by far superior to the cis compounds with regard to their pharmacological activity. As is known 2-phenyl-3-methyl morpholine, either as a free base or as the hydrochloride or theophyllinate has a marked psycho-stimulating effect. Further, this compound is used in the treatment of circulatory diseases and, moreover, is has an appetite-reducing effect. It has been ascertained that the trans compounds are markedly more active than the cis compounds. Consequently, the inventive process is most useful for the preparation of these compounds since the pure trans compounds are obtained thereby.

The invention will now be described by several examples. It should be understood, however, that these examples are given by way of illustration rather than by way of limitation and that many changes may be made in, for example, quantities, starting materials and process conditions in general, without departing in any way from the spirit and scope of the invention.

It is pointed out that other halogenation agents such as for example phosphorous trihalide may be used.

The dimethylformamide should be used in an amount at least such as will suffice to attain the dissolution of the starting products.

Example 1

16.1 grams of threo N-benzyl-1-phenyl-2-hydroxyethyl-amino-propanol-(1)-HCl was dissolved in 80 milliliter of dimethylformamide. 3 milliliter of thionyl chloride were added to the solution thus obtained. This mixture was then slowly heated in a vessel fitted with reflux cooler to its boiling point and the boiling mixture was stirred for 15 minutes. The dimethyl formamide was then removed by distillation. The residue was made alkaline and dissolved in ether. Upon concentration, the base distilled as a slightly yellowish, viscous oil, which crystallized in the receiving vessel. The distilling temperature was 174–176° C. at 2 mm. Hg. The hydrochloride that was obtained from the trans N-benzyl-2-phenyl-3-methyl-morpholine base (77° C.) melts at 217–219° C′ (recrystallized from isopropanol). The yield was 84%.

Example 2

17 grams of threo N-benzyl-1-phenyl-2-oxyethylamino-butanol-(1)-HCl were reacted in the same manner as described in Example 1. The trans 2-phenyl-3-ethyl-4-benzyl-morpholine base obtained distilled at a temperature of 178–180° C. at 2 mm. Hg. Melting point: 72–74° C.

Example 3

10 grams of trans 2-phenyl-3-methyl-4-benzyl-morpholine obtained according to Example 1 were subjected to hydrogenation at room temperature in 30 milliliter of methanol and in the presence of palladium coal. The catalyst was filtered off upon completed hydrogenation and the solution was concentrated. Trans 2-phenyl-3-methyl-morpholine base of a boiling point of 98° C. at 1 mm. Hg was obtained by distillation. Yield: 89%. The hydrochloride crystallized from HCl in methanol and ether. Melting point: 182° C.

What is claimed is:

As a new chemical compound

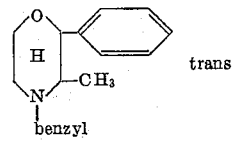

trans

References Cited in the file of this patent

UNITED STATES PATENTS 2,213,469    Leffler               Sept. 3, 1940
2,997,469    Heel et al.           Aug. 22, 1961

FOREIGN PATENTS 791,416    Great Britain        Mar. 5, 1958
1,099,541    Germany            Feb. 16, 1961

OTHER REFERENCES

Lutz et al.: Journ. of Organic Chemistry, vol. 20, pages 49–60 (1956).